United States Patent
Sin Xicola et al.

(10) Patent No.: US 10,156,276 B2
(45) Date of Patent: Dec. 18, 2018

(54) FRICTION MATERIAL, IN PARTICULAR FOR THE MANUFACTURING OF A BRAKE PAD, AND ASSOCIATED PREPARATION METHODS

(71) Applicant: ITT ITALIA S.r.l., Lainate (IT)

(72) Inventors: Agustin Sin Xicola, Barge (IT); Alessandro Angeleri, Barge (IT); Federico Lupone, Barge (IT); Dario Caldarola, Barge (IT); Alberto Conte, Barge (IT); Paolo Colombo, Barge (IT)

(73) Assignee: ITT Italia S.r.l. (IT)

( * ) Notice: Subject to any disclaimer, the term of this patent is extended or adjusted under 35 U.S.C. 154(b) by 60 days.

(21) Appl. No.: 15/210,041

(22) Filed: Jul. 14, 2016

(65) Prior Publication Data

US 2017/0016500 A1  Jan. 19, 2017

(30) Foreign Application Priority Data

Jul. 14, 2015  (IT) .................. 102015000033940

(51) Int. Cl.
   F16D 69/02   (2006.01)
   C04B 111/00  (2006.01)
   C04B 28/00   (2006.01)

(52) U.S. Cl.
   CPC ............ F16D 69/02 (2013.01); C04B 28/006 (2013.01); F16D 69/028 (2013.01); C04B 2111/00362 (2013.01); F16D 2200/006 (2013.01); F16D 2200/0065 (2013.01); F16D 2200/0086 (2013.01); Y02P 40/165 (2015.11)

(58) Field of Classification Search
   None
   See application file for complete search history.

(56) References Cited

U.S. PATENT DOCUMENTS

| | | | |
|---|---|---|---|
| 5,342,595 A * | 8/1994 | Davidovits | ............. C01B 33/26 106/286.5 |
| 7,208,432 B1 | 4/2007 | Beier et al. | |
| 2004/0175544 A1* | 9/2004 | Saikatsu | ............... F16D 69/026 428/143 |
| 2012/0192765 A1 | 8/2012 | Huynh | |
| 2016/0327112 A1* | 11/2016 | Galimberti | ............ F16D 69/026 |

FOREIGN PATENT DOCUMENTS

WO    WO 2014/081277 A1   5/2014

OTHER PUBLICATIONS

Italian Search Report and Written Opinion ofr IT UB20152158; dated Mar. 10, 2016; 9 pages.
"Friction and wear of Cu-free and Sb-free environmental friendly automotive brake materials"; Poh Wah Lee et al.; WEARH; vol. 302, No. 1-2; Jan. 9, 2013; pp. 1404-1413; XP055256347; CH ISSN: 0043-1648; DOI: 10.1016/j.wear.2012.12.046; 10 pages.
European Partial Search Report for EP 16 179 344.3; dated Mar. 14, 2017; 11 pages.

* cited by examiner

*Primary Examiner* — Mary Lynn F Theisen
(74) *Attorney, Agent, or Firm* — Barclay Damon, LLP (57) ABSTRACT

An asbestos free friction material having at least one of the group consisting of inorganic, organic and metallic fibers, at least one binder, at least one friction modifier or lubricant and at least a filler or abrasive, wherein the binder is almost completely and exclusively inorganic and is constituted almost exclusively or exclusively by a hydrated geopolymer or a blend of hydrated geopolymers.

8 Claims, 5 Drawing Sheets

FRICTION MATERIAL, IN PARTICULAR FOR THE MANUFACTURING OF A BRAKE PAD, AND ASSOCIATED PREPARATION METHODS

CROSS REFERENCE TO RELATED APPLICATION

This application claims priority under relevant portions of 35 U.S.C. § 119 to Italian Patent Application No. 102015000033940, filed Jul. 14, 2015. The entire contents of this application are herein incorporated by reference.

TECHNICAL FIELD OF THE INVENTION

The present invention relates to a friction material that is particularly suitable for the manufacturing of brake pads. The invention also relates to methods for preparing such a friction material, which is used for the manufacturing of friction layers/blocks for friction elements such as braking elements, for example vehicle brake pads or brake shoes, and/or clutch discs. The friction material and the associated preparation methods are suitable for manufacturing friction materials that are asbestos-free, having similar or better performance than those belonging to the classes of friction materials known as NAO ("Asbestos-free Organic friction material"), "Low Steel" and "Semi-met".

PRIOR ART

The friction materials of the above types include five classes of components: a fibrous material made from inorganic and/or organic and/or metallic fibers, a binder, a "filler", one or more lubricants or friction modifiers, one or more abrasives. Largely asbestos was used as the fibrous material in the past, which however presents considerable environmental problems and has well known toxic effects on human health, so that it has been banned by the legislation for quite a long time. This material has therefore been replaced with other materials, both inorganic, such as rock or fiber wool, wollastonite and fiberglass, or organic, such as aramid fibers and carbon fibers, as well as metallic such as copper, tin, iron, aluminum and steel powders or fibers, and other metals or metal alloys, such as bronze and brass. The binder is usually a thermosetting polymer, such as for example those based on phenolic resins. Various materials are used as the filler, such as barite (barium sulfate), calcium carbonate, talc, magnesium oxide, vermiculite; as the abrasive, zirconium silicate, zirconium oxide, alumina, silicon carbide, mica; as the friction modifier, metal sulfides such as molybdenum disulfide, iron sulfides, copper, tin, graphite, and/or coke. Other classes of materials are then added in smaller percentages such as for example rubber in powder or granule form, "friction dust", other organic materials.

However, various national and international regulations mandate the use of friction materials that are not only free of asbestos and heavy metals, but which are also provided with a reduced or zero copper content. Nonetheless, copper-free friction materials imply a greater decay in the coefficient of friction over time than other materials; in particular in the event of an increase in temperature as a result of repeated braking.

Furthermore, it has been shown more recently that the organic binders commonly in use may release volatile breakdown products into the atmosphere, in particular as a result of relatively heavy operating conditions (repeated braking, high temperature), such as for example in the form of gaseous compounds or fine dust, which are suspected of being potentially harmful to human health, especially in the long term.

Lee et al/SAE Int. J. Passeng. Cars—Mech. Syst./Volume 6, Issue 3 (November 2013) and Lee et al/WEAR, vol. 302, no. 1-2, 9 Jan. 2013 pages 1404-1413 addresses the study of potential environmentally friendly friction materials, in which the organic fibers and/or copper or copper alloy based fibers are replaced with natural fibers, such as for example hemp, and in which only a minor part of the organic binder is replaced with a generic geopolymeric binder, the chemical composition of which is not defined.

Geopolymers are a class of material which are usually obtained from the reaction of aluminosilicate powder with an alkaline siliceus solution under temperature and pressure close to environmental conditions. Laboratory synthesis of geopolymers usually calls for using metakaolin ($2Al_2O_3.SiO_2$) or calcinated kaolinite, obtained from the thermal activation of kaolinite clay. The precursor reagents for obtaining geopollymeric binders can also be found in natural sources, such as for example in pozzolanic materials, such as lava or coal fly ash. Most of the present studies in the literature were conducted utilizing scrap materials such as industrial waste or rock sediment as a source of aluminosilicates.

It should be noted that geopolymers are inorganic materials completely different from glass and are distinct from the latter on the basis of three fundamental aspects:

1) Production Method

1a. According to ASTM C-162-92(2015), glasses are an inorganic amorphous synthetic material, obtained by progressive hardening of a liquid without the occurrence of crystallization. Hardening of the liquid occurs as a result of the rapid cooling from very high temperatures, which can be higher than 1,000° C.

1b. On the other hand geopolymers are materials obtained by a chemical reaction between an activating solution (acidic or basic) and a solid source of aluminosilicates (P. Duxon, A. Fernandez-Jiménez, J. L. Provis, G. C. Lukey, A. Palomo, J. S. J. van Deventer Geopolymer technology: the current state of the art J. Mater. Sci., 42 (9) (2007), pp. 2917-2933). The reaction already occurs at room temperature. In this reaction a first phase of dissolution of the alumino-silicate can be identified with the creation of some monomers in the solution. Subsequently, these monomers condense with each other in orderless fashion: this is as a result of the fact that since the reaction occurred at room temperature, the system does not have sufficient energy to organize itself into an ordered structure. The polycondenstation creates a progressive increase in the viscosity of the liquid, which forms a gel type structure that consolidates into solid form;

2) Composition:

2a. Vitreous materials (see: Handbook of Ceramics, Glasses, and Diamonds, Harper Charles; Rössler E and Sillescu H 1991, Organic glasses and polymers Glasses and Amorphous Materials and J Zarzycki (V C H, Weinheim) page 573) can be of many different classes, since the production method together with the chemical predisposition of the starting liquid are what allows the vitreous phase to be obtained. Glasses can therefore     i. Based on metal oxides be classified as:
    ii. Based on metal alloys
    iii. Based on salts
    iv. Based on organic polymers 2b. Geopolymers (Joseph Davidovits, "Geopolymer Chemistry and Applications", 4th ed. The Geopolymer Institute, 2015, ISBN: 9782951482098) are instead materials based on just a very specific set of oxides, and in particular:

i. $SiO_2$ Silica, $Al_2O_3$ Alumina, which are always present;
ii. $Na_2O$ sodium oxides, $K_2O$ potassium oxides, and CaO Calcium oxides in basic catalysis;
iii. $P_2O_5$ Phosphorous oxide in acidic catalysis;
iv. $B_2O_3$ boron oxide according to the precursor utilized; several combinations are possible between the various oxides, however in order to obtain a stable geopolymer (that is to say in order to obtain a three-dimensional lattice), well defined stoichiometric ratios between the different oxides have to be respected. Consequently, only precise compositions of oxides may be qualified as geopolymers, while these oxides must be derived from a very precise chemical reaction between the starting raw materials (typically for a geopolymer based on sodium, metakaolin, sodium silicate, and soda);

3) Structure

3a. When heated, a vitreous material always exhibits the glass transition phenomenon. In fact glasses are the only case of an amorphous solid that presents the glass transition phenomenon. (Introduction to Glass Science and Technology, J. E. Shelby). Glasses always have a disorganized structure, but for some particular compositions and by heating above the glass transition temperature, they produce a vitreous-ceramic material constituted by crystalline phases embedded in a vitreous matrix. (Holand W., Beall G. (2002) Glass-Ceramic Technology. The American Ceramic Society);

3b. Since a geopolymer is produced by a polycondensation reaction that determines the formation of a continuous three-dimensional lattice, a geopolymer is instead a gel, and hence an amorphous solid that is NOT vitreous, since it does not exhibit the glass transition phenomenon. Furthermore, for the composition intervals defined for obtaining a geopolymer and published in the literature, the observation is that a geopolymer always leads to well defined crystallization; that is to say, the addition of heat creates a ceramic material, rather than a vitreous-ceramic material.

In conclusion: Geopolymers are not glasses from the structural point of view, they lack the chemical composition typical of commercial off-the-shelf glasses and are not obtained by means of the production techniques for inorganic glasses. Hence geopolymers have nothing in common with inorganic glasses.

In 1976, Davidovits suggested that a single element containing both aluminum and silicon, possibly of geologic origin, could be made to react in a polymerization process in an alkaline solution. The compounds that were created were called "geopolymers" ("Solid-Phase Synthesis of a Mineral Blockpolymer by Low Temperature Polycondensation of Alumino-Silicate Polymers: Na-poly(sialate) or Na—PS and Characteristics" Joseph DAVIDOVITS, IUPAC Symposium on Long-Term Properties of Polymers and Polymeric Materials, Stockholm 1976, Topic III). These inorganic polymers are provided with a chemical composition somewhat similar to zeolithic materials, but are normally amorphous solids, and hence are not provided with a crystalline structure while comprising a repeating unit such as for example of the silicon-oxide (—Si—O—Si—O—), silicon-alumina (—Si—O—Al—O—), ferro-silicate-alumina (—Fe—O—Si—O—Al—O—), or aluminum-phosphate (—Al—O—P—O—) types.

The chemical reaction that gives rise to the geopolymers is called geopolimerization, following a process with several steps, as per the following:

1. The dissolution of the atoms of Si and Al in the material is caused by the hydroxide ions in solution;
2. The reorientation of the precursor ions in solution;
3. The reorganization into inorganic polymers through polycondensation reactions.

The network of the inorganic polymer is usually a highly coordinated three-dimensional aluminosilicate structure, with the negative charges on the trivalent tetrahedral $Al^{(III)}$ sites, balanced by the cations of the alkaline metal.

These materials are presently utilized for replacing cements as construction materials and implementing compound materials comprising a geopolymeric matrix in which organic fibers are dispersed in an ordered manner and which present good mechanical and thermal isolation characteristics. Materials of said composition are for example utilized for constructing the exhaust pipes of vehicles.

Their use as binders in friction materials still has to be explored in depth. In fact, the articles by Lee et al. cited above simply show that replacing the organic binder (in a measure of up to 30%) with a geopolymer leads to obtaining a friction material displaying comparable, even though inferior, characteristics of effectiveness to those of traditional friction materials according to SAE J2430, moreover with an associated significantly greater degree of wear.

Hence in the present state of the art, the potential use of geopolymers as binders in friction materials can be considered only for the purpose of reducing the use of common organic binders: in fact, on one hand only the latter ensure in any event the cohesion of the friction material utilized for implementing, for example, brake pads, while on the other hand the presence of the geopolymer appears to increase wear to an unacceptable level.

WO2014081277A1 offers a potential composition of a geopolymer compound based on volcanic ash to be utilized in friction material mixtures devised for the implementation of brake pads, but does not provide any data, nor example, of a friction material mixture actually utilizing said geopolymer compound, and obviously no data on its potential performance.

Lastly, U.S. Pat. No. 7,208,432 teaches an inorganic composition of a friction material for brake elements in which the binder is constituted by a glass or a vitreous-ceramic matrix in which inorganic reinforcement fibers are dispersed together with a filler constituted by a slip agent consisting of hexagonal structure carbon black with average diameter of between 1 and 500 nm.

SUMMARY OF THE INVENTION

An objective of the present invention is to provide a friction material to be utilized for manufacturing friction layers/blocks for friction elements as brake elements, such as for example vehicle brake pads or shoes, and/or clutch disks, which is not subject to oxidation type degradation as a result of the heat generated during braking, and which therefore permits limiting or eliminating the emission of volatile breakdown products under relatively high operating temperatures, such as for example greater than or equal to 300° C., since the organic binder is completely eliminated or is present only in a minor quantity with respect to the inorganic binder, giving rise at the same time to a material suitable for large scale industrial production while presenting tribological characteristics at least comparable with, if not superior to, those of existing friction materials, which are provided with completely or predominantly organic binders.

Another objective of the invention is to provide one or more methods for implementing a friction material of the above mentioned type which is/are easy to implement and which does/do not lead to unacceptable defects during the production process.

The invention therefore relates to a friction material to be utilized for manufacturing friction layers/blocks of friction elements as the braking element, such as for example vehicle brake pads or brake shoes, and/or clutch disks, as defined in the appended claims.

The invention also relates to a friction element, in particular a brake pad or brake shoe, presenting a layer or block of friction material made from the friction material of the invention.

Lastly the invention relates to a braking system comprising an element to be braked constituted by a brake disk or drum built in cast iron or steel and at least one braking element constituted by a brake pad or shoe suitable for coupling by means of friction to the element to be braked, wherein the braking element presents a friction layer or block devised for coupling to the element to be braked and which is implemented with the friction material according to the invention.

In particular, the friction material according to the invention comprises as its component materials: Inorganic and/or organic and/or metallic fibers; an almost entirely or completely and exclusively inorganic binder constituted by a geopolymer or geopolymer mixture; at least one friction modifier or lubricant, such as for example a material containing sulfides and/or a carbon material or nano-material; and at least one filler or abrasive.

Hereinafter the expression "almost entirely or completely and exclusively inorganic binder" shall be understood as a binder in which the geopolymeric inorganic component, comprised by one or more geopolymers, represents at least 90% by volume with respect to the total overall binder present in the friction material mix or composition according to the invention.

The geopolymeric inorganic binder is preferably, but not necessarily, present in the friction material mixture according to the invention in an amount equal to or greater than 5% by volume and more preferably greater than 25% by volume, calculated on the total volume of the mixture. In fact, it has been verified experimentally that depending on the type of binder and the nature of the other materials utilized in the mixture, utilizing too little inorganic binder leads to mechanical characteristics that are not sufficient for being utilized as a friction material.

The friction material according to the invention is hence almost completely devoid of organic binders (which represent no more than 10% by volume of the total volume of the binder, which is therefore, for the predominant part, totally constituted by one or more geopolymers), so that for this reason it may not be subjected to thermal degradation as a result of high temperature, such as for example higher than 300° C., and up to and beyond 600° C., wherein the reduced amount of organic binder potentially (but not necessarily) present is surprisingly "protected" by the physical-chemical characteristics of the geopolymer.

The inorganic binder utilized in the friction material as the only or main, and hence prevalent, binder according to the invention (that is to say present in greater measure than 90% of the total amount of binder present), in the complete or almost complete absence of traditional organic binders, is obtained from a chemical reaction starting from precursors of inorganic nature such as: $SiO_2$, $Al_2O_3$, $Na_2O$, $K_2O$, $H_3PO_4$, $CaO$.

This reaction, which occurs in the presence of water in either an acidic or a basic environment, leads to the development of a continuous three-dimensional structure, which enables exploiting these compounds as a scaffold for products such as blocks of friction material for braking elements. According to the invention the base chemical reaction, denominated geopolymerization, can occur under widely different synthesis conditions, resulting in the creation of polymeric compounds (geopolymers) that may be provided with either a hydrated crystalline structure, or an amorphous, but still hydrated, structure.

In particular, a "Hydrothermal synthesis" can be carried out, in which under sufficiently energetic conditions (that is to say with adequate temperature and pressure) and for certain low water content compositions, the formation of hydrated crystalline compounds takes place; or instead a "Synthesis in acidic or basic solution" is carried out, where both cases of acidic and basic catalysis results in the development of an amorphous structure at room temperature, which can then be crystallized as a result of subsequent thermal treatments.

The friction material according to the invention is therefore preferably implemented in a manner to present a completely or almost completely inorganic binder scaffold constituted by a geopolymer or geopolymer mixture having crystalline structure.

According to a preferred embodiment of the invention, the inorganic binder is prepared in pre-mixed form, preferably by means of an Eirich mixer, and then combined with all the other materials comprising the friction material mixture preferably in a Loedige mixer, or otherwise in any of the other mixers commonly utilized for friction materials, such as for example in a Henschel or Eirich mixer.

Subsequently, the raw mixture obtained in this manner undergoes a pressing process, by means of which the desired friction element is obtained, such as for example a brake pad or shoe.

Hydrothermal Synthesis

According to a first method that is the object of the invention, a pre-mixture containing only the inorganic binder is prepared starting from kaolin and caustic soda (sodium hydroxide, NaOH). The caustic soda, of the commercial type in pellets or flakes, is ground by means of a Retsch rotor mill in order to convert it into powder form; the powder caustic soda is then added to and mixed with commercial kaolin, such as for example the extra white kaolin of the "L'Aprochimide" firm, which contains about 49% $SiO_2$ and 37% $Al_2O_3$ in addition to $Fe_2O_3$ impurities, in an Eirich mixer in complete absence of water, or at most in presence of a quantity of water by weight equal to or less than the quantity in weight of caustic soda, wherein the water has preferably been pre-mixed with the sodium hydroxide, according to the following stoichiometric formula:

Theoretical:

$$2SiO_2 + Al_2O_3 + Na_2O + 3H_2O \rightarrow \text{Hydro-sodalite: } Na_2Al_2Si_2O_8 3H_2O$$

Real (Starting from Commercial Extra White Kaolin):

$$2.28 \text{ moles } SiO_2/1 \text{ mole } Al_2O_3/2 \text{ moles } NaOH \rightarrow \text{Hydro-sodalite: } Na_2Al_2Si_2O_8 3H_2O$$

In fact, starting from kaolin as the raw material for obtaining the geopolymer binder according to the method of the invention, the water necessary for the reaction is already contained in the kaolin itself, which is generally assumed to have the following chemical formula:

$$Al_2O_3.2SiO_2.2H_2O$$

Subsequently, this pre-mixture is mixed with the other pre-selected components for the desired friction material, so that the raw mixture obtained in this manner is pressed, for example to obtain brake pads, according to the pressing parameters commonly utilized for friction materials based on just only organic binders.

Pressing Following Hydrothermal Synthesis

Pressing the brake pads obtained with the friction material of the invention is hence carried out by introducing the raw mixture into a mold in which a metallic backing or backplate is also placed, suitably treated and optionally provided with a damping/isolating layer known in the art and denominated "underlayer", wherein during the pressing phase not only is the layer or block of friction material formed above the optional underlayer, where present, but the adhesion of said layer or block to the metallic support is also obtained. Pressing is carried out by working at a temperature of between 60 and 250° C. and at a pressure of 50 to 1800 Kg/cm$^2$ for a period of between 1 and 20 minutes, or otherwise preforming the raw mix or mixture in a mold and subsequently pressing the preformed mixture onto the backplate at a temperature of 100 to 250° C. at a pressure of 150 to 500 kg/cm$^2$ (14.7-49 MPa) for a period of 3 to 10 minutes.

Alternatively, the raw mix can be pressed to obtain the block of friction material, which is only subsequently glued to the metallic support or backplate (optionally provided with the underlayer), such as for example by means of phenolic based glues.

Hydrothermal Synthesis Variant

According to a variant of this method, which, as will become clear, represents a preferred embodiment of the invention, the raw mix obtained as described previously by mixing kaolin and pulverized sodium hydroxide in variable proportion between 70:30 (70% kaolin by volume and 30% caustic soda by volume) and 80:20 (80% kaolin by volume and 20% caustic soda by volume), and then mixing this pre-mixture in a Loedige mixer, or otherwise a Henschel or Eirich mixer, together with all the other materials comprising the desired friction material mixture, rather than being utilized immediately as such to press the friction material, is added with water in an amount of 40-45% by weight, over the total weight of the obtained mixture, which finally presents itself in the form of a viscous but easy to work with paste. This paste is subsequently oven dried at 60-80° C. for 24 h; the dried paste is then introduced into a mixer, such as for example an Eirich mixer, and is reduced to powder form; finally this partially "hydrated" raw mix in the form of powder derived from the original dried paste undergoes pressing.

Pressing Following the Hydrothermal Synthesis Variant

Also in this case, pressing the brake pads obtained according to this variant of the hydrothermal method is carried out by introducing the raw mix mixed with water, dried, and reduced to powder into a mold in which a metallic backing or backplate is also placed, suitably treated and optionally provided with a damping/isolating layer (known in the art) or underlayer, wherein during the pressing phase not only is the layer or block of friction material formed, but the adhesion of said layer or block to the metallic support is also obtained. However in this case the raw mix, which still contains water, is placed into a mold and hot pressed at 80-200° C. under pressure of at least 100 Kg/cm$^2$ utilizing a scheme that alternates periods of application of the pressure with periods of release of the pressure in order to allow, according to an aspect of the invention, the release of the free water still present in the mix in the form of steam and in a controlled manner. The scheme to be adopted for carrying out this phase is evaluated from time to time according to the quantity of residual water to be eliminated and the types of material comprising the mix.

Synthesis in Solution

According to another method that is the object of the invention, in order to obtain the pre-mix, instead of starting from kaolin the process starts from metakaolin, such as for example that obtained from the calcination of natural kaolin, while working in water solution with a MR (Molar Ratio) between the water and alumina content in the metakaolin ranging between 25 and 7:

$$25>H_2O/Al_2O_3>7$$

The reaction may occur in either an alkaline or an acidic environment, according to the precursors introduced into the water solution: in order to have basic catalysis KOH or NaOH are dissolved in water; in order to have acidic catalysis an aqueous solution of phosphoric acid H$_3$PO$_4$ is used.

Mixing is carried out by means of a rod mixer with a speed of 1000 RPM for 5 minutes in order to allow close mixing between the solution and the metakaolin, and in order to activate the reaction as much as possible thanks to the large amount of energy provided during mixing.

Subsequently the material is pre-pressed in a mold kept at 40-60° C. while pressing at the same temperature and at a pressure between 50 and 400 Kg/cm$^2$ in order to eliminate during the pressing phase only a minimum amount of the water needed in the reaction, for a period of 3 to 10 minutes.

Subsequently the other materials comprising the desired formulation of the friction material are added, resulting in a raw mix.

Pressing with the Synthesis in Solution

Pressing the brake pads obtained with the friction material according to this embodiment of the invention is carried out by introducing the raw mixture into a mold in which a metallic backing or backplate is also placed, suitably treated and optionally provided with an isolating/damping layer or "underlayer", wherein during the pressing phase not only is the layer or block of friction material formed, but the adhesion of said layer or block to the metallic support is also obtained. Pressing is carried out by working at a temperature of between 40 and 60° C. and at a pressure of 50 to 400 Kg/cm$^2$ for a period between 3 and 10 minutes.

Alternatively, the raw mix can be pressed to obtain the block of friction material, which is only subsequently glued to the metallic support or backplate, such as for example by means of phenolic based glues.

Other Components of the Friction Material

The components of the compound or raw mix of the friction material to be implemented according to the invention may be the components utilized in friction materials already known in the art, with the single provision of completely replacing the present organic binders with one or more geopolymers, reducing at the same time the content of abrasives and instead increasing the content of lubricants.

The friction material according to the invention is also preferably free of copper and/or alloys thereof, both in the form of powders and fibers.

In particular, the component consisting of fibers may consist of any organic fiber or inorganic fiber other than asbestos, or of any metal fiber which is commonly used in friction materials, preferably with the exclusion of copper and the alloys thereof. Illustrative examples include inorganic fibers such as fiberglass, rock wool or fiber, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile), metallic fibers such as, for example, steel fibers, stainless steel, aluminum fibers, zinc, etc.

The fibers can be used in the form of either short fibers or powder.

The amount of fibers is preferably between 2% by volume and 30% by volume with respect to the overall volume of the friction material, and more preferably between 8% and 15% by volume, where the fiber component preferably still includes rock fibers, which have been proven to have a strong affinity with the geopolymers utilized as binders.

Numerous materials known in the art can be used as organic or inorganic fillers. Illustrative examples include calcium carbonate precipitate, barium sulfate, magnesium oxide, calcium hydroxide, calcium fluoride, slaked lime, talc, and mica.

These compounds may be used by themselves or in combinations of two or more. The quantity of such fillers is preferably between 2% and 40% by volume based on the total composition of the friction material.

The friction modifier (which may include all or part of the filler) may include, in addition to carbon materials or nanomaterials, such as for example graphene, an organic filler such as cashew nut powder, rubber powder (pulverized tread rubber powder), a variety of non-vulcanized rubber particles, a variety of vulcanized rubber particles, an inorganic filler such as barium sulphate, calcium carbonate, calcium hydroxides, vermiculite and/or mica, an abrasive such as silicon carbide, alumina, zirconium silicates, metal sulfide based lubricants, such as molybdenum disulfide, tin sulfides, zinc sulfides, iron and non-ferrous sulphides, metallic particles other than copper and copper alloys, and/or a combination of the above.

The abrasives can be classified as follows (the following list is only indicative, not necessarily exhaustive, and non-limiting):

Mild abrasives (Mohs 1-3): talc, calcium hydroxide, potassium titanate, mica, kaolin;

Medium abrasives (Mohs 4-6): barium sulfate, magnesium oxide, calcium fluoride, calcium carbonate, wollastonite, calcium silicate, iron oxide, silica, chromite, zinc oxide;

Strong abrasives (Mohs 7-9): silicon carbide, zirconium sand, zirconium silicate, zirconia, corundum, alumina, mullite.

Preferably but not necessarily, the friction material does not contain strong abrasives, but only medium and mild abrasives, since the geopolymers utilized as the binder already constitute themselves a medium abrasive.

Furthermore, the friction material according to the invention preferably also includes graphite, in an amount between 5% and 15% by volume on the basis of the total composition of the friction material.

The total content of the lubricant, according to the desired friction characteristics, is preferably between 4% to 20% by volume with respect to the overall volume of the material, and may in particular include graphene.

Curing and Painting

The pressed article (brake pad) is, where required by the formulation, post-cured by means of heat treatment at 80 to 400° C. for a period of between 10 minutes and 10 hours, and is then spray-painted or powder-painted, kiln-dried, and eventually machined where necessary to produce the final product.

The friction material obtained by means of the methods of the invention can be utilized in applications such as disk pads, jaws and linings for automobiles, trucks, railroad cars and other various types of vehicles and industrial machines, or otherwise in clutch disks.

BRIEF DESCRIPTION OF THE DRAWINGS

The present invention will now be described in more detail with reference to the following practical non-limiting embodiment examples and with reference to FIGS. 1 to 8 of the appended drawings, wherein.

DETAILED DESCRIPTION OF THE INVENTION

The examples and comparative examples are reported here by way of illustration and are not intended to limit the invention.

Figure 1:
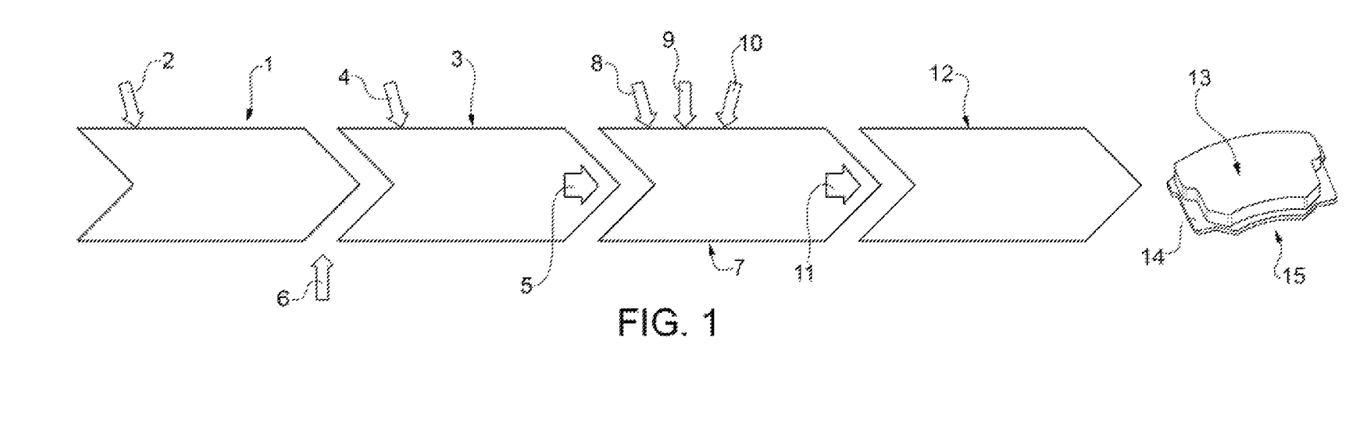
FIGS. 1 and 2 schematically illustrate by means of blocks two possible implementation methods for a friction material according to the invention.
Figure 2:
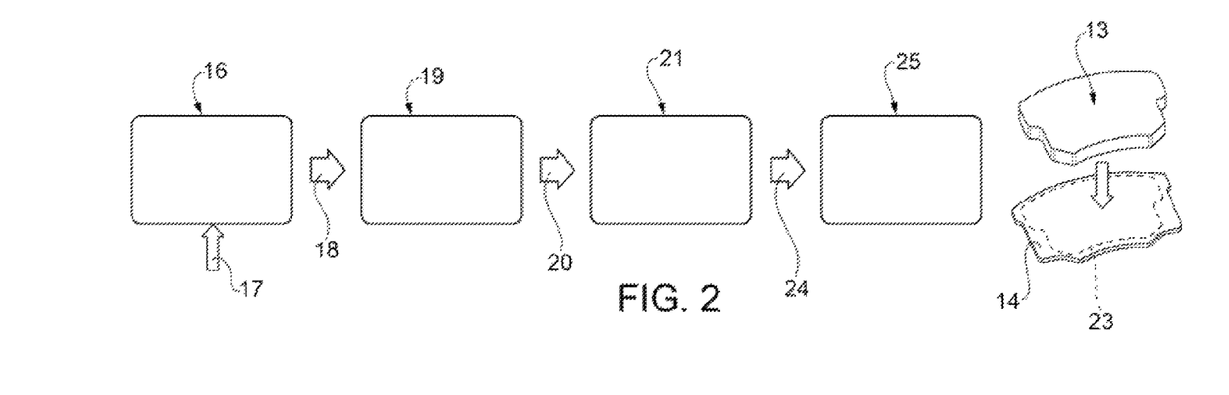

With reference to FIGS. 1 and 2, two different non-limiting possible embodiments are schematically illustrated in blocks of a method for making a block or layer of environmentally friendly friction material, and hence devoid of asbestos, copper and its alloys, and not subject to thermal degradation under use, according to the invention.

With reference to FIG. 1, a block 1 represents a first phase of a first embodiment of a method for implementing a block or layer of friction material according to the invention. According to the illustrated non limiting example, block 1 represents a phase in which sodium hydroxide is obtained in powder form by milling commercial sodium hydroxide (caustic soda) pellets or flakes; in particular, a predetermined amount of commercial sodium hydroxide represented by an arrow 2 is introduced into a rotating mill known in the art, such as for example a Retsch ZM 100 mill, and transformed into powder.

Subsequently, the sodium hydroxide obtained in this manner is fed into block 3, which represents a mixing phase, such as for example that carried out in an industrial mixer of any type known in the art utilized in the field of friction materials, such as for example a Loedige mixer, or otherwise a Henschel or Eirich mixer, in which the sodium hydroxide powder is mixed with a predetermined amount of commercial kaolin, represented by an arrow 4, until obtaining a pre-mix, schematically indicated with an arrow 5 contained in block 3. For calculating the amounts of reagents (caustic soda and kaolin) to be utilized in this phase, the stoichiometric formula calculation techniques by Davidovits et al are utilized, as described in "Geopolymer, Chemistry & Applications" chap. 7.2, Institut Geopolymère, third edition, July 2011.

This mixing phase according to block 3 is carried out preferably inside a dry Eirich mixer, that is to say in the absence of water. According to a variant of this method, it is also possible to pre-hydrate the sodium hydroxide powder, by mixing it with water (represented by an arrow 6) before the mixing phase according to block 3, by utilizing a weight ratio between sodium hydroxide and water preferably equal or close to 1:1.

On average the mixing phase according to block 3 lasts 10 minutes.

Subsequently, according to a block 7, a mixing phase of pre-mix 5 is carried out with the raw materials normally comprised in a friction material, with the exception of the organic binder; the phase according to block 7 is preferably carried out in a Loedige mixer (however it is also possible to utilize other types of mixer such as Henschel or Eirich mixers) feeding pre-mix 5 into the mixer together with inorganic and/or organic and/or metallic fibers (however free of asbestos or its derivates), represented by an arrow 8, with at least one friction modifier or lubricant, represented by an arrow 9, and at least one filler or abrasive, represented by an arrow 10, so that at the end of the mixing a raw mix of friction material is obtained, schematically indicated with an arrow 11 contained in block 7 having as binder the materials of pre-mix 5 exclusively.

Lastly, a block 12 represents a hot pressing phase of raw mix 11 under pressure greater than the water vapor pressure at the pressing temperature, obtaining at the end a block 13 of friction material having as binder exclusively a hydrated geopolymer based on alumino-silicates.

Eventually, at the end of the phase represented by block 12, block 13 of friction material is already obtained integrally with a metallic support 14 known in the art, eventually provided with an isolating/damping layer (underlayer), known in the art and not illustrated for simplicity, implementing a friction element constituted in the illustrative non-limiting example by a brake pad 15.

During pressing phase 12, which is carried out utilizing the usual pressing parameters for brake pads having organic binders, pre-mix 5 geopolymerizes, so as to form the geopolymeric binder according to the invention.

The pressing phase according to block 12 is carried out by introducing raw mix 11 and the eventual metallic support 14 with the eventual underlayer into a mold (known in the art and not illustrated for simplicity) that is heated to a temperature of between 60 and 250° C., wherein raw mix 15 is subjected to a pressing pressure of between 150 and 1800 Kg/cm$^2$ for a period of between 3 and 10 minutes, or instead preforming raw mix 11 and subsequently pressing the preformed mix on metallic support 14, working at a temperature of between 100 and 250° C. and pressing pressure of between 150 and 500 kg/cm$^2$ (14.7-49 MPa) for a period of 3 to 10 minutes. Alternatively, raw mix 11 can be pressed without the presence of metallic support 14, in order to only obtain the block of friction material 13, which is then subsequently glued in a manner known in the art to metallic support 14, optionally provided with an isolating/damping layer (known in the art) or underlayer, utilizing phenolic based glues, such as for example pressing block of friction material 13 against metallic support 14 with the eventual underlayer, working at a temperature of 180° C. for 30 seconds.

Therefore at the end of the method illustrated in FIG. 1 a friction material free of asbestos is obtained, with component materials comprising inorganic and/or organic and/or metallic fibers, at least one binder, at least one friction modifier or lubricant, and at least one filler or abrasive, wherein the binder was obtained by means of hydrothermal chemical synthesis starting from pre-mix 5 and is almost completely or completely and exclusively inorganic, being constituted almost completely or exclusively by a hydrated alumino-silicate geopolymer, or working phase 3, as will be seen, in order to implement pre-mix 5 with other materials, from a mixture of hydrated geopolymers.

In fact, during pressing phase 12 the kaolin reacts with the caustic soda and the water eventually present, forming hydro-sodalite, according to the formula:

$$Al_2O_3.2SiO_2.2H_2O + NaOH \rightarrow Na_2Al_2Si_2O_8.3H_2O$$

(kaolin)+(caustic soda)→(hydrated sodalite)

The materials comprising the raw mix are added to pre-mix 5 in suitable amount so that the total amount of geopolymeric inorganic binder is preferably but not necessarily greater than or equal to 10% by volume and preferably greater than 25% by volume with respect to the volume of the overall friction material.

With reference to FIG. 2, it schematically illustrates a variant of the described method by means of a block diagram; in particular, according to this variant the phases are carried out as was previously described according to blocks 1, 3, and 7, obtaining raw mix 11 with inorganic and/or organic and/or metallic fibers (but not containing asbestos or its derivatives)) 8, at least one friction modifier or lubricant 9, and at least one filler or abrasive 10, identically to what was previously described for the mixing phase represented in FIG. 1 by block 7; however raw mix 11 is not utilized immediately, but is instead subjected to additional operations; in particular, according to a block 16, raw mix 11 is mixed with a predetermined amount of water, represented by arrow 17, in order to obtain a paste 18, also represented by an arrow. Water 17 is added in an amount of less than 40% by weight of the total weight of paste 18; for example on 1 kg of raw mix 11, 690 gr of water are added.

Subsequently, according to a phase represented by block 19, paste 18 is oven dried at a temperature of for example 70° C. for 24 hours, obtaining a dried paste 20 at the end.

Subsequently, dried paste 20 is reduced into powder form by subjecting it to a mixing phase, such as for example in an Eirich mixer, represented by block 21, obtaining a "hydrated" raw mix 24 in the form of dried and pulverized paste.

"Hydrated" raw mix 24 is then subjected to a pressing phase with hot pressing, represented in FIG. 2 by block 25, in order to obtain a block of friction material 13 optionally fastened onto a metallic support 14 eventually provided with an isolating/damping layer 23 known in the art, and denominated underlayer, on the part devised for receiving block 13. However this hot pressing phase according to block 25 is carried out working at a temperature of between 110 and 150° C., and preferably 120° C., hot pressing raw mix 24 with a pressure of at least 300 Kg/cm$^2$ and employing a pressing scheme that provides for periods of application of the above mentioned pressure, alternating with pressure release periods in order to allow the release of the "hydration" water present in raw mix 24 in the form of steam and in a controlled manner, since drying phase 19 does not in any event eliminate all the water 17 added in phase 16.

More generally, the friction material according to the invention can be obtained with one of the two described methods with reference to FIGS. 1 and 2, or instead by implementing the geopolymer binder by synthesis in water solution, rather than the described hydrothermal method, which remains in any event the preferred method. Furthermore, in addition or instead of kaolin other starting raw materials can be utilized, such as metakaolin $2Al_2O_3.SiO_2$, sodium silicate, calcium hydroxide, or even phosphoric acid in case an acidic catalysis is preferred in order to obtain an alumino-phosphate polymer.

The friction material according to the invention is therefore characterized by the fact of including an almost exclusively or totally inorganic binder constituted by a geopolymer belonging, more in general, to one of the families listed in Table 1 below, which also lists the starting raw materials and the reagents needed to obtain the geopolymeric binder, in accordance with each listed family.

TABLE 1

| Families/Reagents | | Raw materials | | |
|---|---|---|---|---|
| | | Source of silicon and alumina | Source of silicon and $Me_2O$ alkaline oxides | Activator |
| Families | Polysialate Si:Al 1:1 | kaolin, metakaolin, fly ash, other alumino silicates, quartz, sand | / | Basic NaOH, KOH, |
| | Polysialate-Polysiloxo Si:Al > 1 | Clay, metakaolin, fly ash, other alumino-silicates, quartz, sand | Sodium and potassium silicates | Basic Sodium and potassium carbonates |
| | Calcium base Si:Al ≥ 1 | Metakaolin, calcium slag | Sodium and potassium silicates | Basic $Ca(OH)_2$ |
| | Phosphate base | Metakaolin, alumina | / | Acidic H3PO3 |

(Me = metal)

According to Table 1, the geopolymeric inorganic binder of the friction material according to the invention is selected from the group consisting of: Polysialate having a Si/Al ratio equal to 1:1; Polysialate-Polysiloxo having a Si/Al ratio>1; Calcium based polysialate having a Si/Al ratio≥1; aluminum-phosphate polymer.

Furthermore, in particular following the methods of FIGS. 1 and 2, the geopolymeric inorganic binder of the friction material according to the invention is at least partially crystalline, and comprises crystallized hydrated sodalite.

Material components 8, 9, and 10 do not utilize asbestos or its derivates, nor copper or its alloys; therefore the friction material according to the invention is substantially free or almost free of organic binders, is substantially free of copper and its alloys and/or copper and copper alloy fibers, and is preferably, but not necessarily, substantially free of strong abrasives, where hereinafter the term "substantially free" means that the indicated materials may be present as sole impurities; the at least one abrasive contained in the friction material according to the invention is therefore preferably, but not necessarily, a medium or mild abrasive; where said terms refer to the following classification, already indicated previously:

Mild abrasives (having Mohs hardness between 1 and 3): for example talc, calcium hydroxide, potassium titanate, mica, kaolin;

Medium abrasives (having Mohs hardness between 4 and 6): for example barium sulfate, magnesium oxide, calcium fluoride, calcium carbonate, wollastonite, calcium silicate, iron oxide, silica, chromite, zinc oxide;

Strong abrasives (having Mohs hardness between 7 and 9): for example silicon carbide, zirconium sand, zirconium silicate, zirconia, corundum, alumina, mullite.

Lastly, according to an additional aspect of the invention, the volume ratio between the lubricants and the abrasives contained in the friction material is preferably comprised between 1:1 and 1:4, while for example in friction materials with organic binder it can be greater than 1:8.

Furthermore, the starting raw materials for obtaining the geopolymer binder are chosen so that the geopolymeric inorganic binder in the friction material according to the invention presents a $SiO_2/Al_2O_3$ ratio of between 1.5 and 2.5, and a $SiO_2/Na_2O$ ratio of between 1.5 and 2.5.

Hydrothermal Synthesis

More generally, the geopolymeric inorganic binder of the friction material according to the invention is obtained according to the methods of FIGS. 1 and 2 via hydrothermal synthesis working (in phases 12 and 25) at a temperature T of between 80° C. and 500° C., and preferably of between 110° C. and 200° C., under a pressure P greater than the saturation pressure (vapor pressure) of water at the pressing temperature, in order to have liquid water.

The reaction occurs by local diffusion of the solid state ions, resulting in the crystallization of hydrated minerals.

Synthesis in Solution

The geopolymeric inorganic binder of the friction material according to the invention can also be obtained by synthesis in solution, where according to the invention the starting materials are metakaolin and a basic solution of sodium or potassium and/or calcium hydroxide in water, or otherwise an acid solution of phosphoric acid in water, working with a molar ratio (MR) of water to alumina between 25 and 7: $25>H_2O/Al_2O_3>7$, while ensuring that the geopolymerization reaction occurs at a temperature greater than or equal to 40° C. for 5-7 days.

EXAMPLE 1—Comparison Between Synthesis Methods

In order to verify the feasibility of obtaining an inorganic binder suitable for manufacturing friction materials for friction elements such as brake pads, a series of synthesis experiments were carried out.

Hydrothermal Synthesis Procedure 100 g of white kaolin of the "L'Aprochimide" firm are mixed with 28.6 g of milled powder caustic soda. The obtained mix is pressed into disks by means of an XRF press with a diameter of 31 mm, with a pressure of 1000 to 4000 kg/cm²; subsequently, the obtained pressed disks are treated in the oven at 150° C. for 1 h30'.

Figure 3:
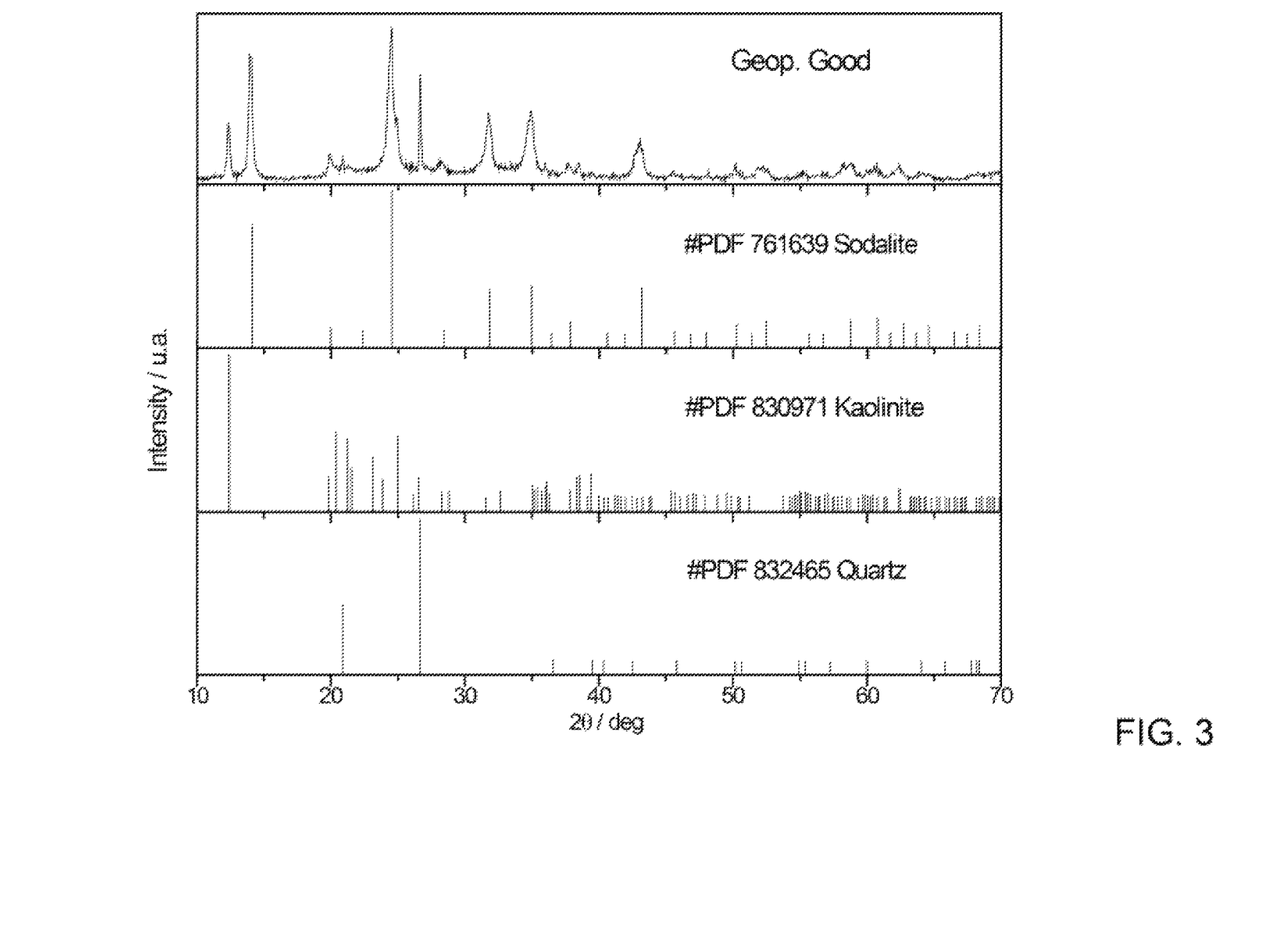
FIGS. 3 and 4 illustrate the X-ray diffraction spectra of inorganic binder samples utilized in the friction material according to the invention.

The X-ray crystallography spectra show the graphs of FIG. 3, which prove the formation of hydro-sodalite, in the presence of a small amount of unreacted kaolin, in addition to an increase of the signal associated with quartz with respect to the initial kaolin.

Synthesis Procedure in Solution

Metakaolin Argical S1200 is mixed with a basic activating solution with ratio of 37.5% m/m metakaolin and 62.5% m/m activating solution; the latter is composed as follows: 22.5% m/m $SiO_2$ colloidal silica, 20% m/m NaOH, 57.5% m/m $H_2O$. Mixing the constituents is carried out by means of a rod mixer for 15 minutes at 1000 RPM and subsequently the paste obtained in this manner is subjected to curing for 7 days at 40° C. in a sealed container in order to develop the maximum degree of mechanical resistance.

Figure 4:
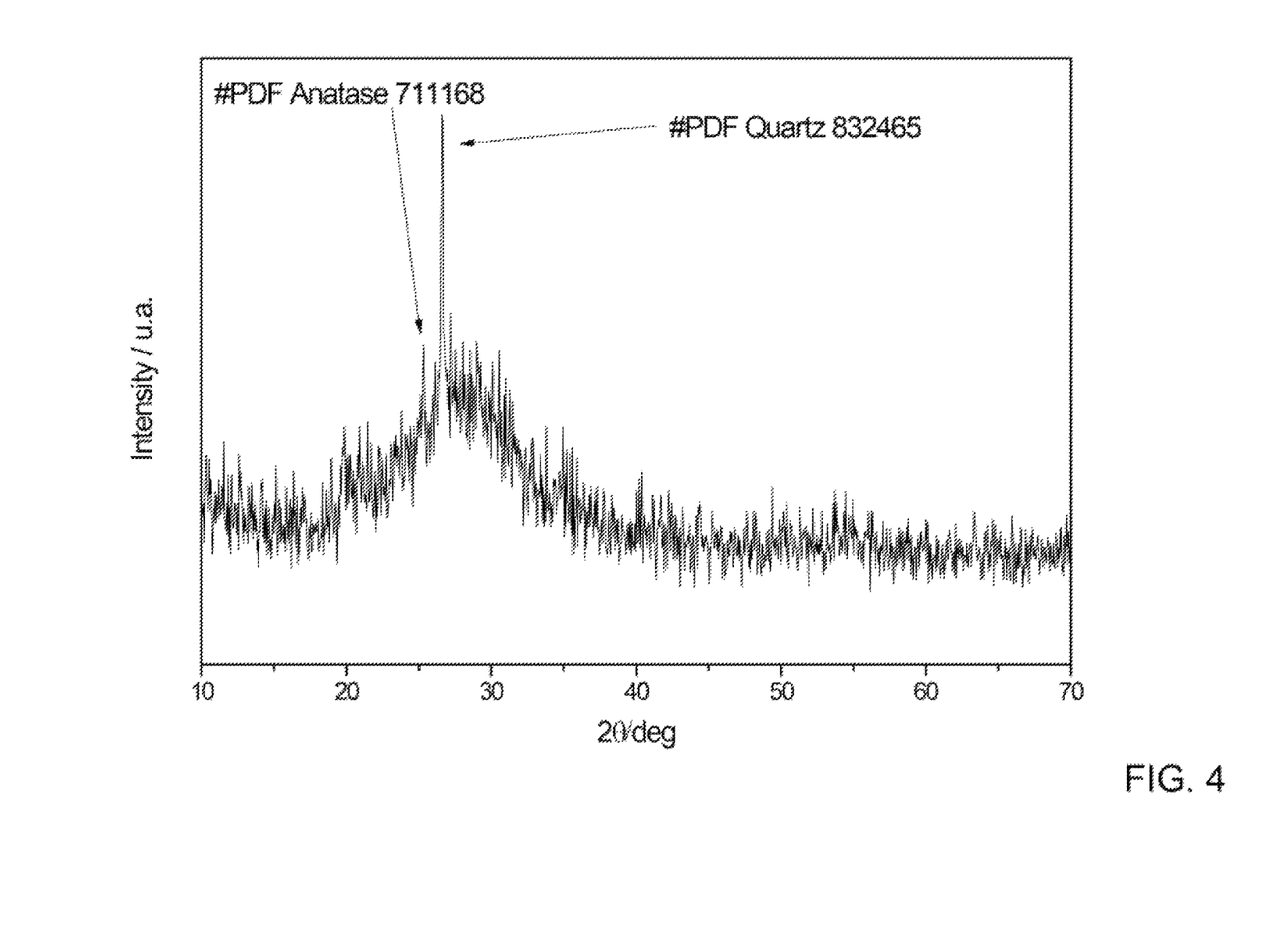

The X-ray crystallography spectra reveal the graph of FIG. 4, which shows the presence of an amorphous solid in addition to quartz and anatase impurities deriving from the metakaolin used for the synthesis. These impurities are negligible since their signal is quite low with respect to the amorphous material.

Working as in the above, additional syntheses were carried out utilizing the metakaolin in the hydrothermal synthesis, and vice-versa kaolin in synthesis in solution with and without adding sodium silicate, in order to work the synthesis with $SiO_2/Al_2O_3$ MR (molar ratio) equal to 2 or equal to 3.8. For simplicity, the obtained results are schematically summarized in Table 2:

TABLE 2

| | HYDROTHERMAL SYNTHESIS ($P > P_{H2O\ saturation}$, 110° C. < T < 200° C.) | SYNTHESIS IN WATER SOLUTION (7 days at 40° C.) |
|---|---|---|
| Metakaolin + NaOH ($SiO_2/Al_2O_3$ = 2) | DOES NOT REACT | DOES NOT REACT |
| Metakaolin + NaOH + Sodium Disilicate ($SiO_2/Al_2O_3$ = 3.8) | DOES NOT REACT | REACTS |
| Kaolin + NaOH ($SiO_2/Al_2O_3$ = 2) | REACTS | DOES NOT REACT |
| Kaolin + NaOH + Sodium Disilicate ($SiO_2/Al_2O_3$ = 3.8) | DOES NOT REACT | DOES NOT REACT |
| Ideal composition | $SiO_2/Al_2O_3$ = 1.5-2.5 $SiO_2/Na_2O$ = 1.5-2.5 | $SiO_2/Al_2O_3$ = 3.5-4.5 $Na_2O/Al_2O_3$ = 0.7-1.5 $H_2O/Al_2O_3$ = 7-20 |

As can be inferred from Table 2, the results of the synthesis are not trivial and cannot be predicted a priori. For the compositions with MR=2, using the dry method, the result is the in situ crystallization of a hydrated sodium alumino-silicate as a result of the applied temperature and pressure. Starting from kaolin, this occurs because the crystalline structure of kaolin contains hydration water (13% m/m), which enables a localized reaction in situ.

This composition for the reaction in solution shows that with metakaolin, after 5 days at 40° C. in the sealed container, the system presents itself as a highly viscous paste, which after a light stress tends to break apart into plastic fragments, thus signaling a failed reaction. Also when utilizing kaolin, the geopolymerization reaction does not occur.

Instead, the composition with MR=3.8 provides for a different reaction mechanism because it occurs in solution. As already stated, the first phase of dissolution of the raw materials is followed by a second curing phase. In case of metakaolin, the geopolymerization reaction occurs. Instead using kaolin as the raw material, after 1 month at 40° C. in a sealed container, we still have an unreacted medium-high viscosity solution that tends to flow under its own weight.

In conclusion, in order to obtain the geopolymerization reaction under industrial conditions for obtaining friction materials, it is necessary to select not only the starting raw materials, but also the process and the correct $SiO_2/Al_2O_3$ molar ratio in relation to the raw materials themselves, otherwise the geopolymerization does not occur. Therefore, the choice of the correct process parameters is essential and not obvious for obtaining a friction material having only a geopolymer as the binder.

EXAMPLE 2—Implementation of Brake Pads

Two formulations of friction material were prepared utilizing for each component the average value of the intervals listed in Table 3 below:

TABLE 3

| | Geopolymer mix Vol % | - Traditional mix with phenolic resin Vol % |
|---|---|---|
| Aramid fiber | 2-4 | 2-4 |
| Rock fiber | 8-12 | |
| Phenolic resin | | 16-19 |
| Friction Powder | | 3-5 |
| Graphite | 11-14 | 6-8 |
| Strong abrasive | | 15-18 |
| Medium abrasive | 5-7 | 5-7 |
| Mild abrasive | 9-12 | 15-18 |
| Sulfides | 4-2 | 4-6 |
| Coke | | 23-26 |
| Steel fiber | 5-8 | 10-13 |
| Inorganic Binder mix | 56-60 | |
| TOTAL | 100 | 100 |

The inorganic binder mix is prepared starting from kaolin of the "L'Aprochimide" firm of the "extra white" type mixed with caustic soda powder obtained by milling commercial sodium hydroxide in a rotating Retsch ZM 100 mill. The composition of the tested inorganic binder mix is obtained utilizing the average value of the composition intervals listed in Table 4 below:

TABLE 4

| FORMULA | Inorganic Binder mix Vol % |
|---|---|
| Kaolin | 75-80 |
| Caustic soda | 25-15 |
| TOTAL | 100 |

The binder mix is prepared by dry mixing and is added to the remaining ingredients of the mix according to the steps described in reference to FIGS. 1 and 2. Subsequently, always working as described with reference to FIGS. 1 and 2, six brake pads are pressed with the traditional mix for comparison purposes, 6 brake pads are pressed for the "geopolymer" mix obtained according to the process of FIG. 1, and 6 brake pads are pressed for the "geopolymer" mix obtained according to the process of FIG. 2.

The "geopolymer" mixes show Brinell hardness values comparable to those of the comparison sample, average density in water of 2.44 g/cm³, and excellent resistance to corrosion in the tests in water, water and salt, and citric acid.

EXAMPLE 3—Brake Test

The brake pads produced as described in example 2 were subjected to the following tests:
Efficiency tests according to the AKM standard, comprising: bedding in braking events, braking events at different fluid pressures, "cold" evaluation braking events (<50° C.), freeway simulation braking events, two series of high energy braking events (first FADE test) interspersed by a series of regenerative braking events. From this test it is also possible to extrapolate, in a manner known to a person skilled in the art, the wear that the brake pads and the brake disks are subjected to.

The obtained results are illustrated in FIGS. 5 to 8, which represent a significant summary of the obtained experimental curves.

Figure 5:
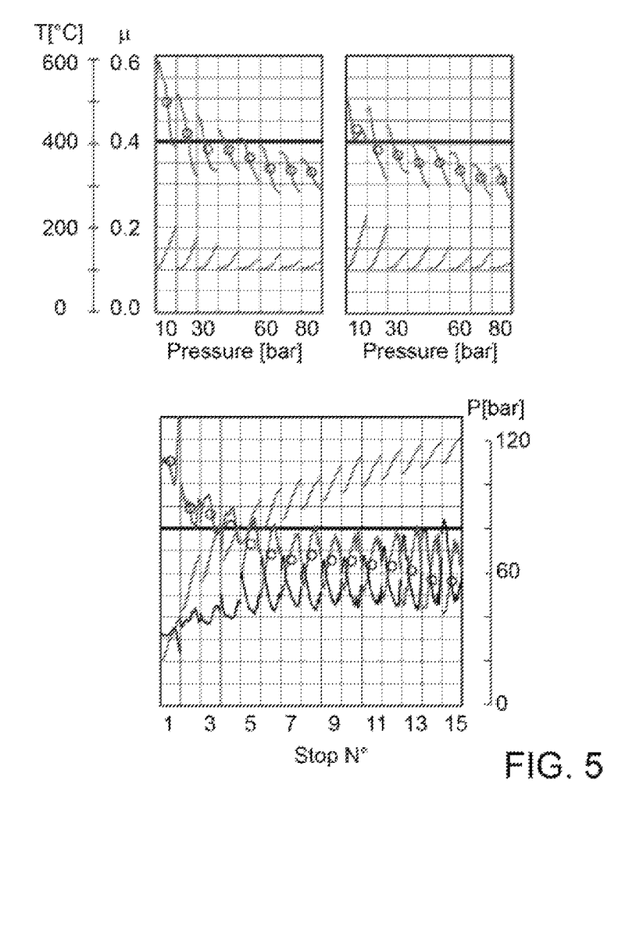
FIGS. 5 and 6 illustrate the results in simplified graphs of the comparison of the braking efficiency according to the AKM standard of the same brake pads implemented with the formulation of friction material in the prior art (FIG. 6) and with a similar formulation of friction material, but implemented according to the invention (FIG. 5)
Figure 6:
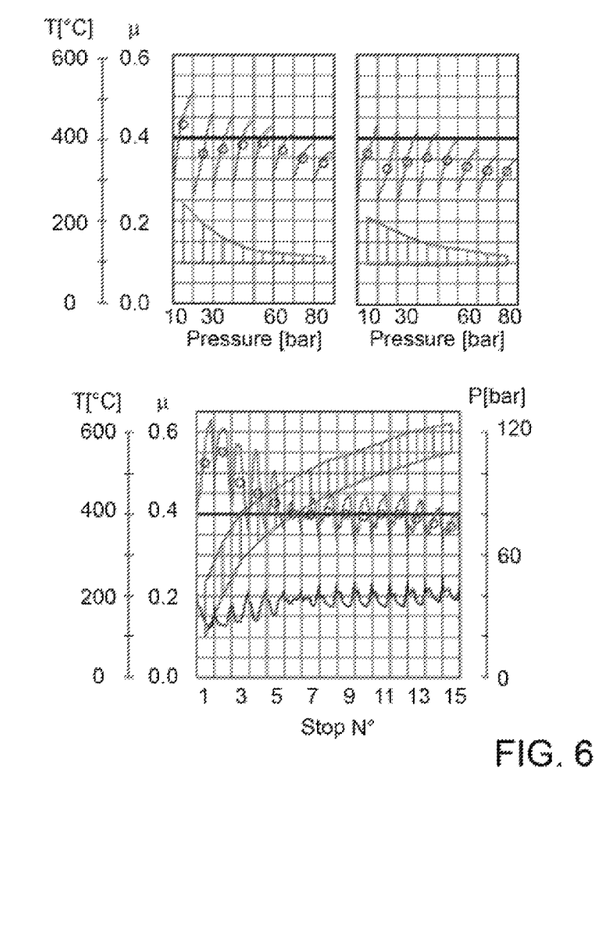

With reference to FIGS. 5 and 6, these serve to compare the behavior of the reference mix provided with the organic binder (FIG. 6), with the "geopolymer" mix obtained from the dry mixed pre-mix, according to the process scheme of FIG. 1. As can be immediately noticed, the values of the friction coefficient against the braking pressure (top graph) and the "fade" (bottom graph) are comparable, so that the performance of the "ecological" mix with the binder based exclusively on the geopolymer are perfectly acceptable for the practical application of brake pads and/or shoes.

Figure 7:
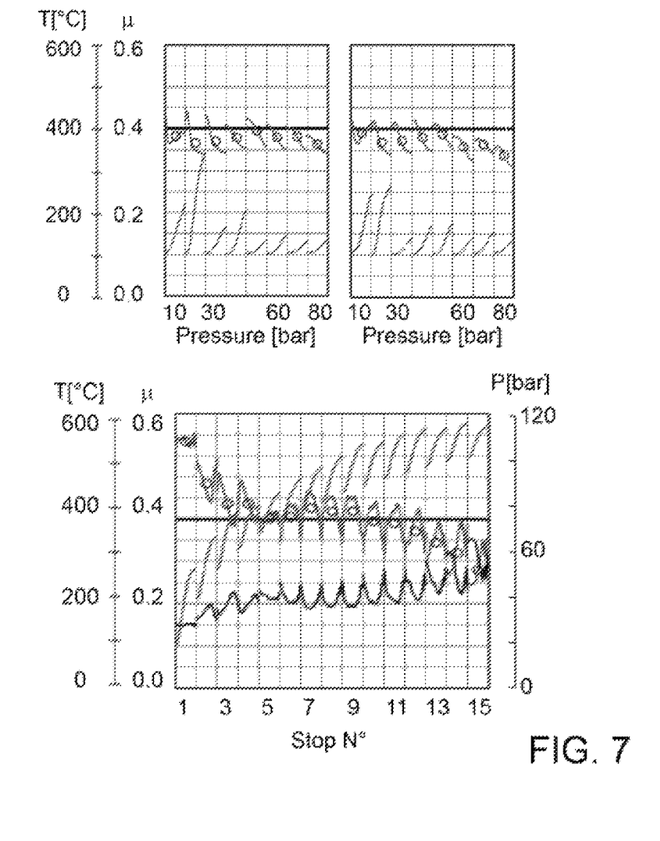
FIGS. 7 and 8 illustrate the results in simplified graphs of the comparison of the braking efficiency according to the AKM standard of the same brake pads implemented with an identical formulation of friction material according to the invention but utilizing two different variants of a synthesis method of the binder of said friction material.
Figure 8:
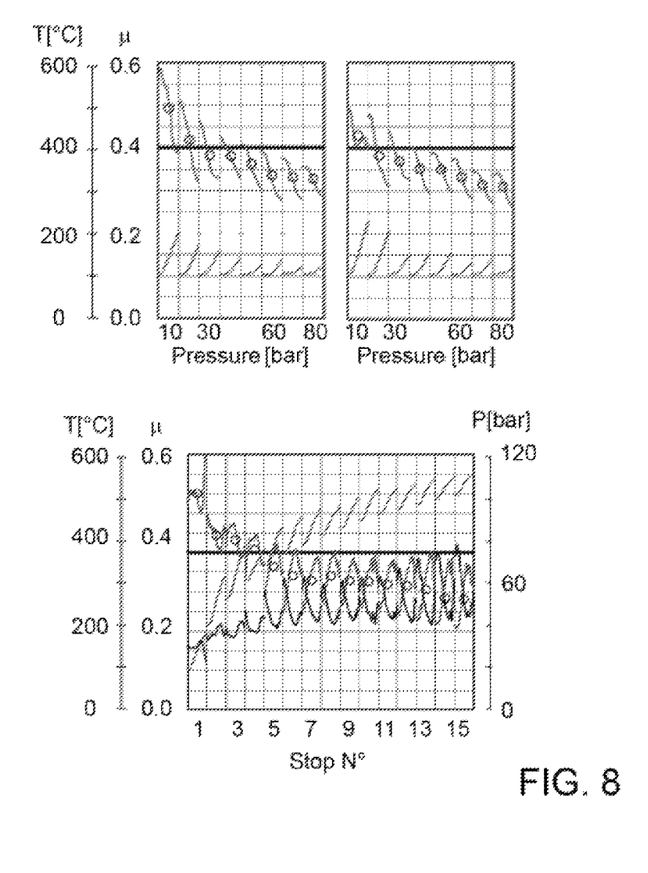

With reference to FIGS. 7 and 8, these compare the behavior of the "geopolymer" mix obtained from the dry mixed pre-mix, according to the process scheme of FIG. 1 (FIG. 8), with the "geopolymer" mix having identical composition, but which is obtained from the mix mixed with water, according to the process scheme of FIG. 2.

With identical ingredients the friction coefficient is stabilized, and even improved in absolute terms, providing a precise indication of the fact that the process according to the scheme of FIG. 2 leads to obtaining a friction material having better tribological characteristics.

Lastly, the tests were repeated with the reference mix having an organic binder (FIG. 6) and with a "geopolymer" mix obtained from the dry mixed pre-mix, according to the process scheme of FIG. 1, with the addition of an organic binder (phenolic resin) in the amount of 9% by volume with respect to the total volume of the geopolymeric binder present in the mix, obtaining comparable results. Furthermore, even bringing the mix with the geopolymer and the organic binder to a temperature of 450° C. did not lead to an observable release of fumes or vapor or organic particles into the environment.

In conclusion, according to the invention a friction material having comparable or better tribological characteristics is obtained (according to the adopted process) with respect to the friction materials known in the art provided with an organic binder, with the advantage that it does not undergo the thermal degradation that organic binders are subjected to under operation, with the consequent elimination of the emission of organic compounds into the atmosphere.

The objectives of the invention are therefore fully achieved.

The invention claimed is:

1. A method for manufacturing a block or layer of asbestos free and in use insensitive to thermal degradation friction material, comprising the following steps:
   a) obtaining sodium hydroxide in powder form;
   b) mixing the sodium hydroxide in powder form with commercial grade kaolin in powder form, until a pre-mixture is obtained;
   c) blending the pre-mixture with at least one of the group consisting of inorganic, organic and metallic fibers, at least one friction modifier or lubricant and at least one filler or abrasive, in order to obtain a raw mixture of friction material having as the binder almost entirely or exclusively the pre-mixture materials; and
   d) hot molding the raw mixture under a pressure greater than the water saturation pressure at the molding temperature in order to obtain a block of friction material having as the binder almost entirely or exclusively a hydrated geopolymer, during the molding step the pre-mixture geopolymerizing in order to form the geopolymeric binder.

2. The method according to claim 1, wherein step a) includes grinding the sodium hydroxide available commercially in the form of pellets or flakes.

3. The method according to claim 1, wherein step b) is carried out in a dry manner, without the presence of water.

4. The method according to claim 1, wherein step b) is carried out after having pre-hydrated the sodium hydroxide.

5. The method according to claim 1, wherein the raw mixture is mixed with water in order to obtain a paste, the paste is dried in an oven, the dried paste is reduced to powder form to obtain a hydrated raw mixture and finally the hydrated raw mixture is molded in step d).

6. The method according to claim 4, wherein step d) is carried out by hot pressing the hydrated raw mixture under pressure according to a scheme that provides periods of application of the pressure alternating with periods of release of the pressure in order to allow the release, in the form of steam and in a controlled manner, of any free water still present in the hydrated raw mixture.

7. The method according to claim 4, wherein step b) is carried out after having pre-hydrated the sodium hydroxide with a ratio of sodium hydroxide and water equal to, or close to, 1:1 by weight.

8. The method according to claim 6, wherein step b) is carried out after having pre-hydrated the sodium hydroxide with a ratio of sodium hydroxide and water equal to, or close to, 1:1 by weight.

* * * * *